United States Patent
Chen et al.

(10) Patent No.: US 12,210,366 B2
(45) Date of Patent: Jan. 28, 2025

(54) POWER FEEDBACK CONTROL SYSTEM AND METHOD OF MGP SYSTEM

(71) Applicant: Guizhou Power Grid Company Limited, Guiyang (CN)

(72) Inventors: Julong Chen, Guiyang (CN); Haisen Zhao, Guiyang (CN); Zhenming Liu, Guiyang (CN); Bin Sun, Guiyang (CN); Yi Xue, Guiyang (CN); Qingsheng Li, Guiyang (CN); Qingming Zhao, Guiyang (CN); Yu Zhang, Guiyang (CN); Xueyong Tang, Guiyang (CN); Pu Deng, Guiyang (CN)

(73) Assignee: Guizhou Power Grid Company Limited, Guiyang (CN)

( * ) Notice: Subject to any disclaimer, the term of this patent is extended or adjusted under 35 U.S.C. 154(b) by 341 days.

(21) Appl. No.: 17/265,819

(22) PCT Filed: Jul. 10, 2020

(86) PCT No.: PCT/CN2020/101261
§ 371 (c)(1),
(2) Date: Apr. 2, 2022

(87) PCT Pub. No.: WO2021/169145
PCT Pub. Date: Sep. 2, 2021

(65) Prior Publication Data
US 2022/0244750 A1 Aug. 4, 2022

(30) Foreign Application Priority Data
Feb. 29, 2020 (CN) .......................... 202010132457.3

(51) Int. Cl.
*G05F 1/66* (2006.01)
*H02J 3/44* (2006.01)
(Continued)

(52) U.S. Cl.
CPC ................. *G05F 1/66* (2013.01); *H02J 3/44* (2013.01); *H02P 25/024* (2016.02); *H02P 25/30* (2013.01);
(Continued)

(58) Field of Classification Search
CPC ..... G05F 1/66; H02J 2203/10; H02J 2300/20; H02J 3/44; H02P 2103/20; H02P 25/024; H02P 25/30
See application file for complete search history.

(56) References Cited

U.S. PATENT DOCUMENTS 11,239,779 B2 * 2/2022 Tuckey .................... H02P 9/02
11,368,114 B2 * 6/2022 Huang .................... H02P 9/105

* cited by examiner

*Primary Examiner* — Vincent H Tran
(74) *Attorney, Agent, or Firm* — IDEA Intellectual Limited; Margaret A. Burke; Sam T. Yip

(57) ABSTRACT

The invention discloses a power feedback control system and method of MGP system, including detecting the actual active power sent by the generator to the grid through the measurement and calculation module; making a difference between the measured active power and the given active power; calculating frequency regulation amount through the PI regulation module according to the difference, and taking it as feedback; calculating the frequency reference value of the converter in the control system; through the adjustment module adjusts finely the frequency of the converter and adjust the phase difference of frequency modulation to achieve controlling power output, so when the new energy predicts its output power based on power feedback control using MGP before connecting to grid, the output of the control system will not delay and affect the stability and reliability of the control system, ensuring the smooth introduction of new energy grid-connected methods.

4 Claims, 6 Drawing Sheets

(51) Int. Cl.
  *H02P 25/024* (2016.01)
  *H02P 25/30* (2006.01)
  *H02P 103/20* (2016.01)
(52) U.S. Cl.
  CPC ....... *H02J 2203/10* (2020.01); *H02J 2300/20* (2020.01); *H02P 2103/20* (2015.01)

Overview of electrical meter control system data

14:25:26

Target power W
600.0

Active power W
0.0

Feedback calculation of frontal rate voltage
50.130

Line frequency
0.000 HZ

The output frequency
50.13 HZ

Voltage 6.40 V
current 0.000 A
reactive power 0.0 VAR apparent power 0.0 VA
power factor 0.000

The PID Set up table

| | | |
|---|---|---|
| PID channel number | 25.0 | error coefficient | 0.0 |
| proportionality coefficient | 6.0 | upper limit of output | 1000.0 |
| integral coefficient | 1.0 | lower output value | -5000.0 |
| differential coefficient | 0.0 | | |

Frequency Control    Frequency Control    Power Control    Power Control

FIG. 1

POWER FEEDBACK CONTROL SYSTEM AND METHOD OF MGP SYSTEM

FIELD OF THE INVENTION

The invention relates to a technical field of grid control system, in particular to a power feedback control system and method of MGP system.

BACKGROUND OF THE INVENTION

New energy represented by photovoltaic and wind power is fluctuant, which is a factor causing the instability of grid operation after grid connection, but in the future new energy grid of high proportion or even nearly 100%, even if the sufficient new energy power and energy storage, and the application of energy connection and demand side response technology are expected to ensure that the grid is not subject to power shortage or instability due to fluctuation, the stable operation of the grid is also affected by a further important factor which is that a plurality of new energy converters replace the synchronous generators, resulting in a high degree of power electronic characteristics of the grid, which makes the power supply characteristics of the grid change fundamentally, and brings great challenges to the stable operation of the power system, mainly shown in that: 1) new energy grid connection lacks reliable inertial response, and the frequency tolerance is low, which cause the decrease of frequency disturbance resistance of the grid; 2) new energy converter lacks sufficient transient voltage and current support ability, which cause the decrease of fault ride through ability of new energy; 3) the operation control of new energy and the interaction between the new energy and power grid lead to new oscillation problems, so it is of great significance to propose a new method of new energy grid connection.

In the process of proposing a new method of new energy grid connection, because the characteristics of new energy generation are very different from those of traditional thermal power unit. The biggest difference is that the output power of new energy is fluctuant and uncontrollable. The traditional thermal power unit can be regarded as a power source that uses chemical energy to store energy and can adjust and control output power at any time, however, the new energy often needs the support of the power grid and delivers power to the grid randomly. Such characteristics make it necessary to predict the output power of new energy when MGP is connected to the grid based on power feedback control. On the one hand, the process of prediction will cause the output delay of the control system, on the other hand, if the prediction is not accurate, the stability and reliability of the control system will be affected. Therefore, an improved control method suitable for MGP is necessary to propose, to follow the power fluctuation of new energy according to the power output characteristics of new energy, the DC voltage fluctuation characteristics of grid-connected inverter, and the operation control characteristics and power angle characteristics of MGP.

SUMMARY OF THE INVENTION

The purpose of the section is to outline some aspects of embodiments of the present invention and to briefly introduce some of the optimal embodiments. Some simplifications or omissions may be made in the section and in the abstract of the Claims, and the name of the invention to avoid ambiguity as to the purpose of the section, the abstract of the Claims and the name of the invention, and such simplification or omission shall not be used to limit the scope of the present invention.

The present invention is to solve the technical problem that when MGP is connected to the grid based on power feedback control, it is necessary to predict the output power of the prior new energy, which causes that the output of the control system is delayed and the stability and reliability of the control system are not guaranteed.

Therefore, the present invention is to solve the technical problem: the output of the control system is delayed and the stability and reliability of the control system are not guaranteed as it is required to first predict the output power of the new energy when MGP is connected to the grid based on power feedback control.

In order to solve the above technical problem, the present invention provides the following technical solutions: a power feedback control system of a MGP system, including a measurement calculation module, used to detect an actual active power sent by a generator to the power grid and calculate the different between the measured active power and the set active power; a PI regulator module used to work out the frequency regulation amount based on the difference obtained and used as feedback; an regulator module, used for fine tuning of the frequency converter according to a frequency reference value of the frequency converter calculated in a control system and adjust the phase difference by frequency modulation.

As a preferred embodiment of the power feedback control system of the MGP system of the present invention, wherein the PI regulator module specifically includes a calculation unit for calculating the frequency regulation amount based on the difference obtained; a feedback unit used for feeding back the calculated frequency regulation amount to the system.

As a preferred embodiment of the power feedback control system of the MGP system of the present invention, wherein the regulator module specifically includes a detection unit for detecting the frequency reference value of the frequency converter calculated in the control system; an adjustment unit used for fine tuning of the inverter frequency according to the frequency reference value of the inverter detected by the detection unit and adjusting the phase difference by frequency modulation.

As a preferred embodiment of the power feedback control system of the MGP system of the present invention, the requirement for setting a target power of the power feedback control system is specifically described as below: clicking to set the reference value of the active power output by the generator; and the active power reference value is an A-phase active power of the generator which cannot exceed the rated power of the motor, and the transmission power of the motor is maintained within the rated range.

As a preferred embodiment of the power feedback control system of the MGP system of the present invention, wherein when the power feedback control system is used, the given value of the active power is set to a small value, and "the changeover switch of the feedback control system" is "set" to the "power feedback signal position".

As a preferred embodiment of the power feedback control system of the MGP system of the present invention, wherein the given value of the active power is set to 300 W.

As a preferred embodiment of the power feedback control system of the MGP 15 system of the present invention, as the power feedback control system is a single control quantity and a single controlled quantity, only one group of the PI regulation module (200) is needed to achieve closed-loop control.

In order to solve the above technical problem, the present invention also provides the following technical solutions: a power feedback control method of a MGP system, which comprises the following steps: detecting the actual active power sent by the generator to the power grid through the measurement calculation module; calculating the difference between the measured active power and the given value; working out the frequency regulation amount based on the difference obtained and used as feedback; calculating the reference value of the frequency converter; fine tuning the frequency converter through the regulation module; adjusting the phase difference by frequency modulation, and achieving the goal of controlling the power output.

The present invention has the beneficial effects that: a power feedback control system and method for MGP system is provided which improves the stability of the new energy grid, and when predicting the output power of new energy before MGP is connected to the grid based on power feedback control, the output of the control system will not be delayed and the defects that affect the stability and reliability of the control system will not appear, so as to ensure the successful introduction of new energy grid connection method.

BRIEF DESCRIPTION OF THE DRAWINGS

In order to elaborate the technical solutions described in the embodiments of the present invention, a brief introduction of the drawings used in the description of the embodiments are provided below. Obviously, the drawings in the following descriptions are only for some embodiments of the present invention. For ordinary technicians skilled in the art, other drawings can also be obtained from these drawings without creative work. Wherein:

FIG. 1 depicts the first physical picture of the power feedback control screen for the power feedback control system of MGP system provided by the present invention;

DETAILED DESCRIPTION

Figure 2:
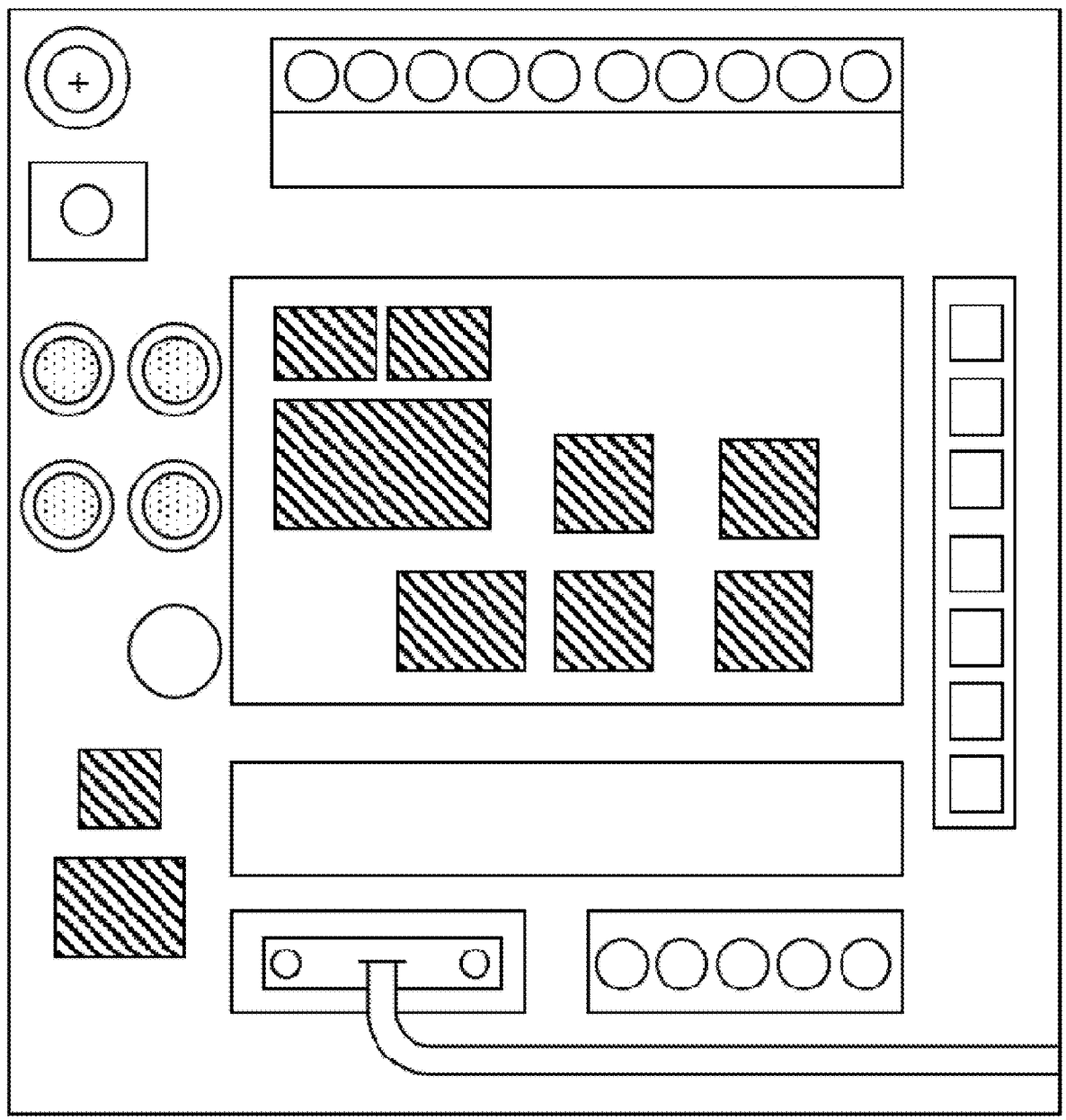
FIG. 2 depicts the second physical picture of the power feedback control screen for the power feedback control system of MGP system provided by the present invention.
Figure 3:
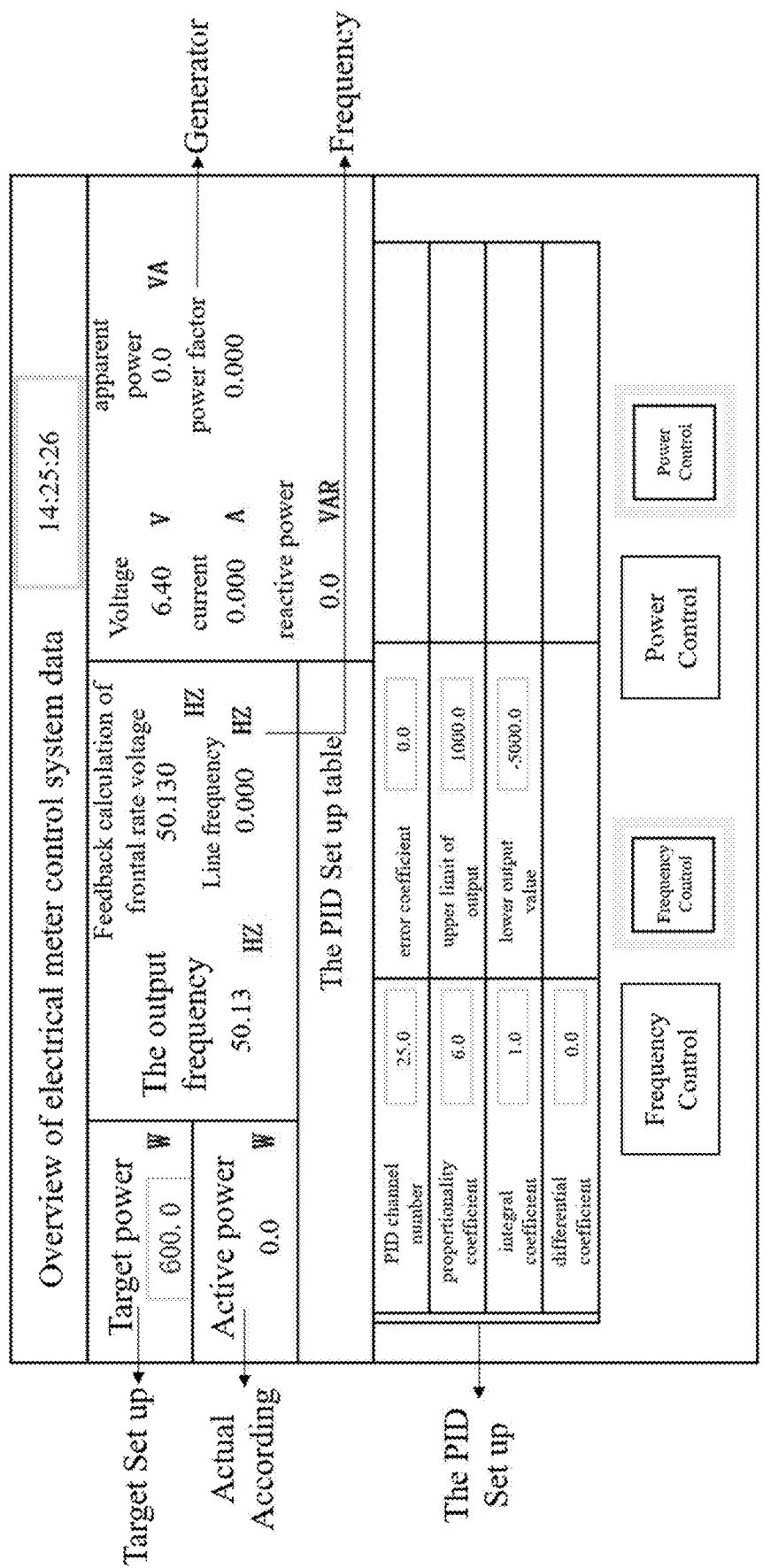
FIG. 3 depicts the content displayed on the power feedback control screen for the power feedback control system of the MGP system provided by the present invention.
Figure 4:
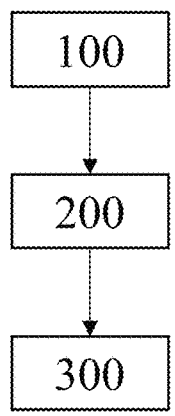
FIG. 4 depicts a block diagram for the power feedback control system of the MGP system provided by the present invention.

In order to make the above-mentioned objectives, characteristics and advantages of the present invention more obvious and understandable, combining the attached drawings of the specification, the embodiments of the present invention will be further described in detail as follows. Apparently, the described embodiments are only part of the embodiments of the present invention, but not all the embodiments. According to the embodiments of the present invention, all other embodiments that the ordinary technicians skilled in the art obtained without creative work, should fall within the protection scope of the present invention.

The following descriptions include many specific details for fully understanding of the present invention, while the present invention can also be implemented in other ways that are different from those described herein, and those skilled in the art can make similar popularization without departing from connotations of the present invention. Therefore, the present invention is not limited by the specific embodiments disclosed below.

Secondly, "one embodiment" or "embodiment" referred to herein refers to a specific feature, structure, or characteristic that can be included in at least one embodiment f the present invention. "In one embodiment" described in different places of the specification does not necessarily refer to the same embodiment, nor an embodiment which is separately or selectively exclusive with other embodiments.

The present invention will be clearly described in combination with schematic diagrams. When the embodiments of the present invention are described in detail, to make it easy for presentation, a cross-section view showing a device structure will not be partially enlarged according to the general scale, and the schematic diagram is only used for an example and should not limit the protection scope of the present invention. In addition, consideration of three-dimensional dimensions of length, width and depth should be included in actual production.

In the description of the present invention, it should be noted that the "above, below, inside, and outside" in the terms refer to the direction or position as shown in the attached drawings. The terms are provided only for the convenience of describing the present invention and simplifying the description, rather than indicating or implying that the device or element referred therein must have a specific direction, must be constructed or operated in a specific direction, they cannot be construed as a limitation on the present invention. In addition, the terms "first, second, or third" are used for description purpose only, and cannot be construed as indicating or implying relative importance.

In the present invention, unless otherwise clearly specified and defined, the terms including "install", "join", and "connect", should be understood in a broad sense. For example, it can be a fixed connection or a removable connection or integration; it may be mechanical connection or electrical connection or direct connection; also indirect connection through a medium; it may also be internal communication between two components. For ordinary technicians skilled in the art, the specific meaning of the above terms in the present invention can be understood according to the specific context.

Embodiment 1

FIGS. 1-8 depict the first embodiment of the power feedback control system of the MGP system provided by the present invention: a power feedback control system of the MGP system, which comprises a measurement and calculation module 100, a PI regulation module 200, and a regulation module 300. They may be realized or implemented by computer hardware, a combination of hardware and software, or by computer instructions stored in non-transient computer-readable memory. The power feedback control system of the MGP system comprises:

A measurement and calculation module 100, which is used to detect the actual active power delivered by a generator to power grid and make a difference between the measured active power and the given active power;

A PI regulation module 200, which is used to calculate the frequency regulation amount according to the difference between the measured active power and the given active power obtained from the measurement and calculation module 100 and take the frequency regulation amount as feedback;

A regulation module 300, which is used to fine tune the frequency of the converter according to the frequency reference value calculated in the control system, which is in response to the feedback of the frequency regulation amount obtained from the PI regulation module 200, and regulate the phase difference through frequency modulation.

Further, the PI regulation module 200 specifically comprises:

A calculation unit, which is used to calculate the frequency regulation amount according to the difference between the measured active power and the given active power obtained from the measurement and calculation module 100;

A feedback unit, which is used to feed back the calculated frequency regulation amount to the system for the regulation module 300.

Further, the regulation module 300 specifically comprises:

A detection unit, which is used to detect the frequency reference value of the converter which is calculated in the control system in response to the feedback of the frequency regulation amount obtained from the PI regulation module 200;

A regulation unit, which is used to fine tune the frequency of the converter according to the frequency reference value which is detected by the detection unit, and regulate the phase difference through frequency modulation.

The new energy drives the synchronous motor to rotate as a prime mover, and the synchronous motor drives the synchronous generator to connect to the grid. This integrated grid connection system is called renewable energy synchronous generator (RESG). By this means, the new energy is connected to the grid through the synchronous unit and the synchronous unit is equivalent to being connected in series to the grid, which can not only transmit active power, but also flexibly adjust reactive power by using the excitation system.

The power feedback control system takes the active power output by the generator as feedback to control the power transmission of the MGP system. When the generator is connected to the grid, the control system takes effect which can continuously regulate the active power transmitted by the MGP system through the control system.

Wherein the parameters of the power feedback control system are described as follows:

1. Target power setting: click to set the reference value of active power output by generator; wherein the reference value of active power is the active power of the generator phase A. Note that the reference value of active power cannot exceed the rated power of the motor, and the transmission power of the motor should also be maintained within the rated range in consideration of certain mechanical losses.
2. Actual power display: actual power display is used to display the actual output active power of generator, which is the active power of generator phase A.
3. PID parameter setting: click to set the PID parameters of the control system, which comprise the proportional, integral and differential coefficients. Note that the parameters have been set before the prototype leaves the factory and do not change the parameters randomly.
4. Display of other parameters of generator: display the voltage, current, apparent power, power factor and reactive power of the generator parallel point, and the electrical quantities are the measurement and calculation result of single phase.
5. Frequency display: display the grid frequency and feedback calculation output frequency of control system. The grid frequency is the grid frequency read through the communication with the electrical quantity transmitter. The feedback calculation output frequency is the frequency value calculated by PLC through feedback, which is sent to the converter through 485 communication as the external frequency given source.

Instructions: when it is necessary to use the control system, turn the changeover switch of the feedback control system to the power feedback signal position, and the control system is powered on. Generally, set the given value of the active power to a small value such as 300 W, start the converter, and connect the generator to the grid after the motor enters the steady state, and the control system will take effect after the MGP is connected to the grid.

In actual operation, the reference value of active power can be dynamically modified through the display screen. Note that the active power set is the active power of the generator phase A, the reference value of active power cannot exceed the rated power of the motor, and the transmission power of the motor should also be maintained within the rated range in consideration of certain mechanical losses.

Due to the direct acquisition of frequency feedback to regulate the phase and control the active power, the measurement accuracy of the device is very high. The control method which is easily realized in simulation is not easy to realize in the experiment due to the accuracy limitation of device. Therefore, it can be considered to change the phase from direct regulation to indirect regulation to avoid the problem that the control system is too sensitive to frequency. Because the actual grid frequency is constantly changing, the output voltage frequency of the converter should follow the frequency of the grid. In addition, the phase difference between the terminal voltage of the two motors in MGP system is proportional to the transmission power. When frequency difference exists between the two ends of MGP system, the frequency difference will affect the phase, therefore, the frequency difference can be directly used to control the transmission of active power, that is, when the actual transmission power is greater than the target power, increase the output voltage frequency of the converter to enlarge the phase difference and increase the transmission power; when the actual transmission power is less than the target power, reduce the output voltage frequency of the converter to shorten the phase difference and decrease the transmission power. The control effect is realized by PI controller, herein the difference between the actual power and the target power is taken as the input, and through PI controller, the frequency regulation amount $\Delta f$ is output; on the basis of set power frequency, $\Delta f$ is added to control the frequency of the frequency inverter output voltage. Because the system is a single control quantity and a single controlled quantity, only a group of PI controller is needed to realize the power closed-loop control.

Figure 5:
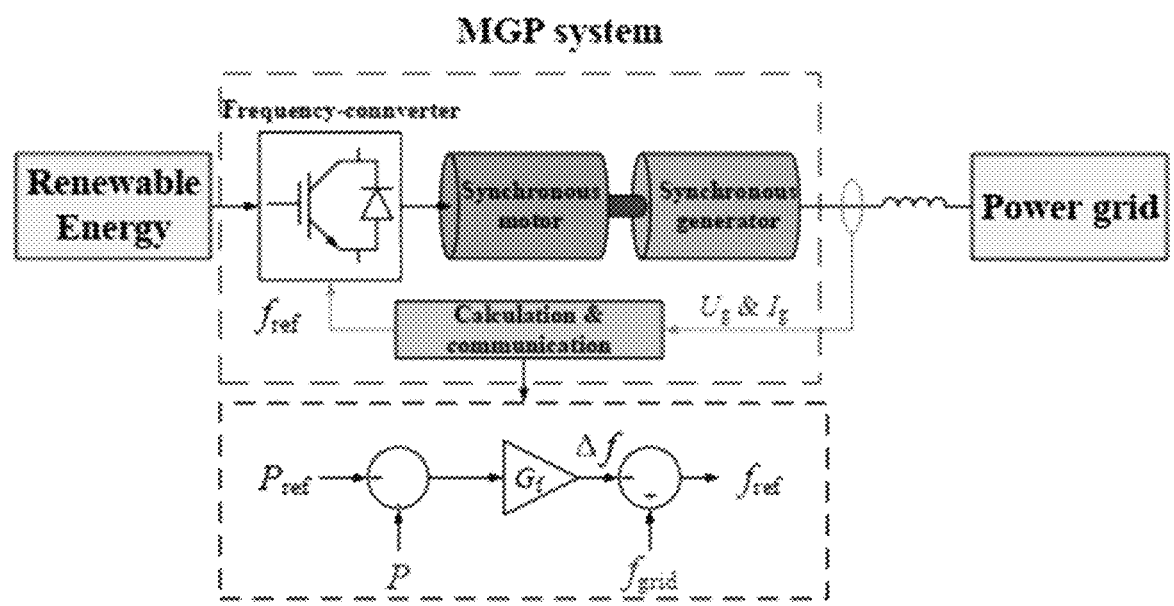
FIG. 5 depicts a power feedback control schematic diagram for the power feedback control system of the MGP system provided by the present invention.

Based on the analysis, the present invention proposes a power feedback control system as shown in FIG. 5. The measurement and calculation system detects the actual active power delivered by the generator to the grid, and makes the difference between the measured active power and the given active power, and according to the difference, the frequency regulation amount is calculated through PI regulation and taken as feedback. In the control system, calculate the frequency reference value of the converter, fine tune the frequency of the converter, and regulate the phase difference by frequency modulation, so as to control the power output.

Description of Power Feedback Control Principle:

The two synchronous motors in MGP system have different power angle characteristics from the common single synchronous motor. The phase difference $\Delta\theta$ of the source network (the phase difference between the motor and generator end voltage) is in a linear relation with the transmitted active power, and the transmission power of MGP system can be controlled by the phase difference $\Delta\theta$ of the source network; the principle can be seen directly from the experimental results of MGP power angle characteristics shown in FIG. 6.

Figure 6:
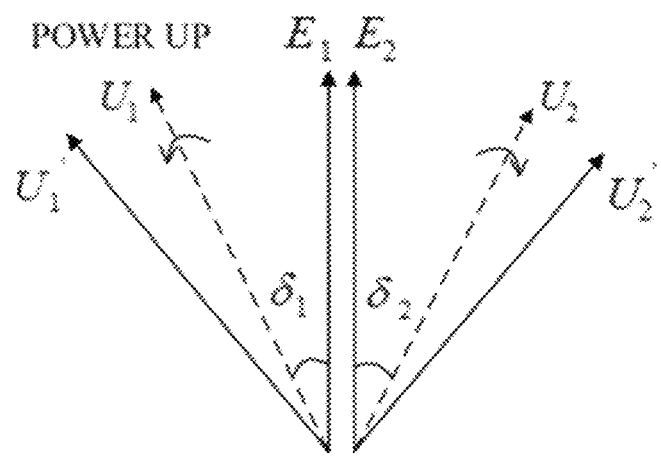
FIG. 6 depicts variation characteristic diagram for the power angle of two machines when power transmitted by MGP changes in power feedback control system of MGP system provided by the present invention.
Figure 7:
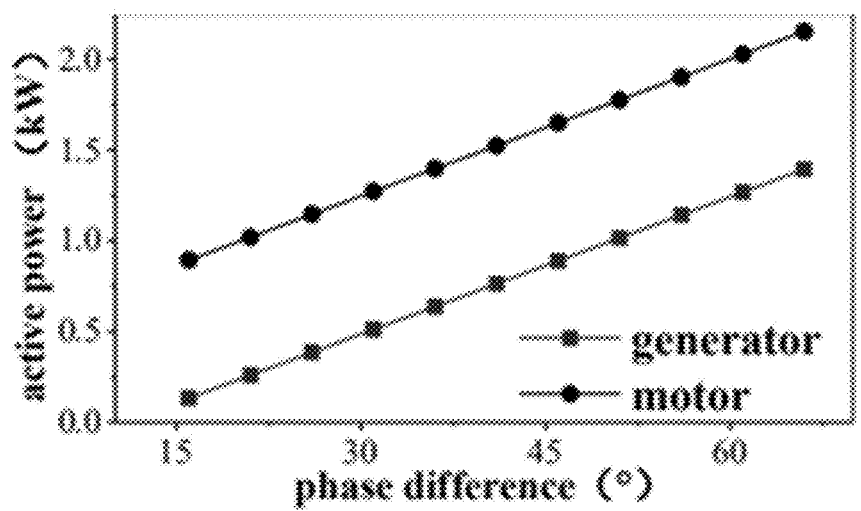
FIG. 7 depicts an experimental curve of the phase difference between source network and the power transmitted by MGP in power feedback control system of MGP system provided by the present invention.

It can be seen from the FIG. 6 and FIG. 7 that when the power transmitted by MGP changes, the power angles of the two motors change simultaneously; on the contrary, when the power angle is adjusted, the power transmitted by MGP also changes. Therefore, the prior control method of MGP is to use the power angle characteristics of two synchronous motors to control the phase difference of the source network and regulate the transmission power. Considering that MGP is connected with two synchronous AC systems, if frequency difference exists between the two systems, the phase difference of the source network may be out of control, causing low-frequency oscillation in the MGP system. It can be seen from the figure that the phase difference between the terminal voltage of the two motors in MGP system is proportional to the transmission power.

Simulation Analysis of Power Feedback Control:

The control algorithm is studied through simulation, and the effect of the power feedback control algorithm is analyzed. Except the control algorithm is modified, other simulation system models are unchanged. During the simulation, the power reference value is changed from 2 kW to 2.5 kW at 25 s. Considering that the original control system is highly sensitive to the frequency, it is necessary to study the working characteristics of MGP system under the condition of power grid frequency fluctuation, therefore the frequency of the grid is set with varying degrees of fluctuation during the simulation.

Figure 8:
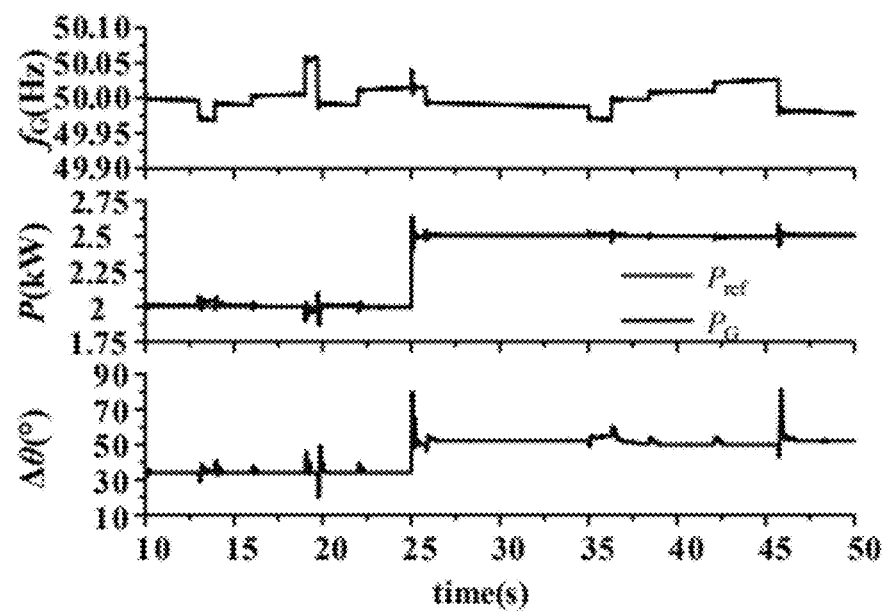
FIG. 8 depicts the simulation results for the power feedback control system of the MGP system provided by the present invention.

Simulation results: as shown in FIG. 8, where $f_G$ is the frequency of synchronous generator terminal voltage. In the whole simulation process, due to the power closed loop, the frequency of inverter output voltage continuously follows the frequency of the grid. Under this condition, the generator can output active power according to the given power value. During the simulation, the fluctuation of grid frequency makes the phase of source network fluctuate, and then affect the output power of generator. At this time, the power closed loop provides feedback and regulates the output frequency of the converter to maintain the phase of the source network in a controllable and stable state, so as to maintain the output power of the generator.

Embodiment 2

Figure 9:
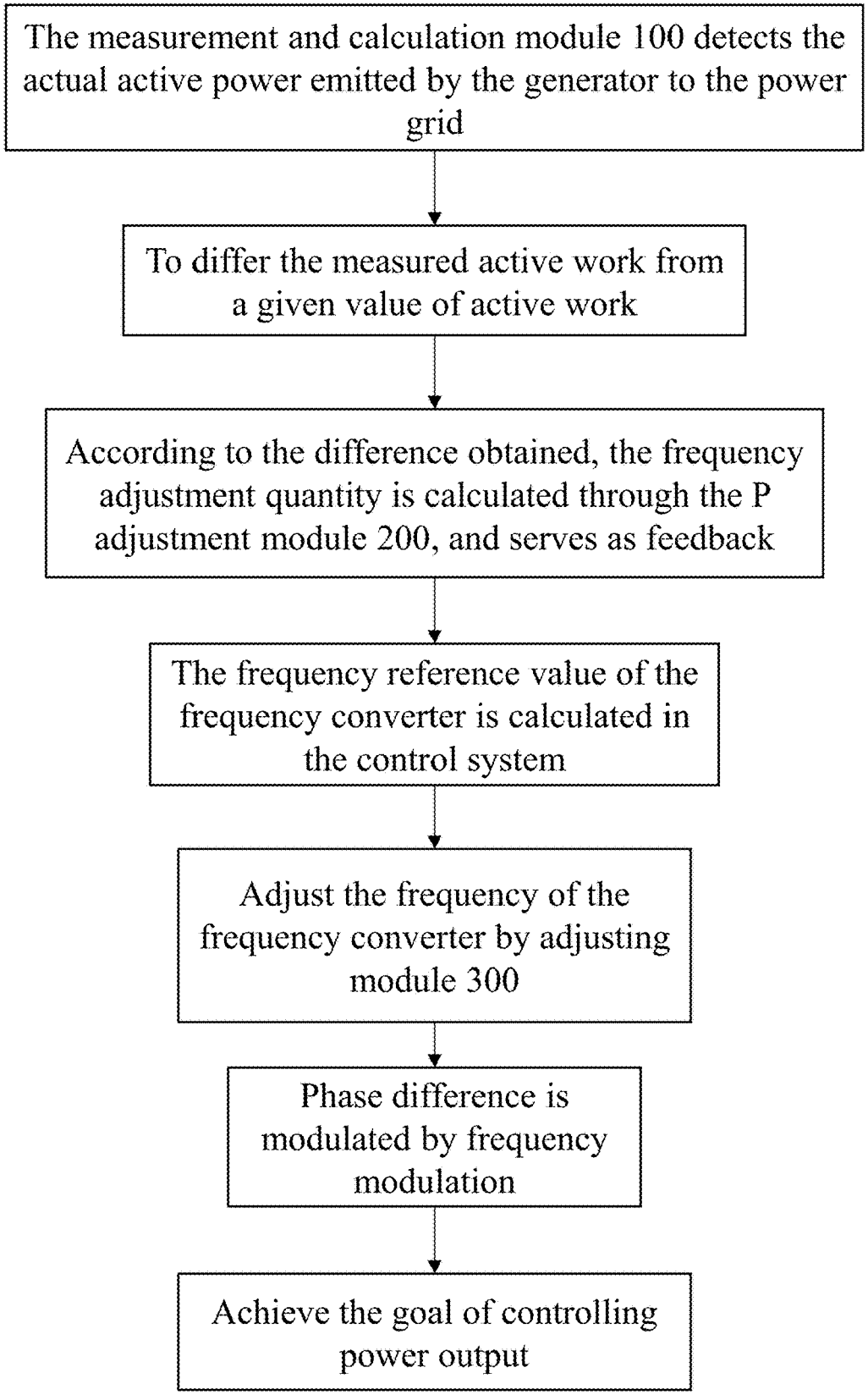
FIG. 9 depicts the flow chart for the power feedback control method of the MGP system provided by the present invention.

FIG. 9 depicts the first embodiment of the power feedback control method of the MGP system provided by the present invention: a power feedback control method of the MGP system, which comprises:

A measurement and calculation module 100 is used to detect the actual active power delivered by a generator to power grid;

The difference between the measured active power and the given active power is;

The frequency regulation amount is calculated by PI regulation module 200 and used as feedback according to the difference;

The frequency reference value of converter is calculated in the control system;

A regulation module 300 is used to fine tune the frequency of the converter;

The phase difference is regulated through frequency modulation;

A goal of controlling the power output is realized.

It should be recognized that, embodiments of the invention may be realized or implemented by computer hardware, a combination of hardware and software, or by computer instructions stored in non-transient computer-readable memory. The method can be implemented in a computer program using standard programming techniques (including a non-transient computer-readable storage medium configured with computer programs), wherein the storage medium configured in this way enable the computer to operate in specific and predefined ways—according to the method described in specific embodiments and figures. Each program can be implemented in a high-level process or object-oriented programming language to communicate with a computer system. However, the program can be implemented in assembly or machine language as required. In any cases, the language can be compiled or interpreted. In addition, the program can be run on a dedicated integrated circuit programmed for the purpose.

The procedures described herein in any appropriate order can be followed, unless otherwise indicated or otherwise obviously inconsistent with the context. The procedures described herein (or variations and/or combinations thereof) can be executed under the control of one or more computer systems configured with executable instructions, and can be implemented as code (for example, an executable instruction, one or more computer programs, or one or more applications), hardware, or a hardware combination that execute together on one or more processors. The computer program comprises a plurality of instructions that can be executed by one or more processors.

Furthermore, the method can be implemented in any type of computing platform that is operationally connected to the appropriate one, including but not limited to personal computer, minicomputer, master frame, workstation, network or distributed computing environment, separate or integrated computer platform, or communication with charged particle tools or other imaging devices, etc. The invention may be realized by machine-readable codes stored on a non-transient computer-readable storage medium or device, whether the storage medium is mobile or integrated into a computing platform, such as hard disk, optical reading and/or write-in storage medium, RAM and ROM; the storage medium is readable by a programmable computer, when the storage medium or device is read by a computer, it may be used to configure and operate the computer to perform the procedures described herein. In addition, machine-readable code, or parts of it, can be transmitted over wired or wireless networks. When the medium (combined with a microprocessor or other data processor) is used to implement the procedures described above, the invention comprises these and other different types of non-transient computer-readable storage media. The invention also comprises the computer itself when programming according to the method and techniques described in the present invention. A computer program can be applied to the input data to perform the functions described herein, so that the input data is transformed to generate output data stored in non-volatile memory. The output information can also be applied to one or more output devices, such as a display. In the preferred embodiment of the invention, the transformed data represents physical objects, including a specific visual representation of physical objects produced on the display.

As used in the application, the terms "component", "module", "system", are intended to refer to a computer-related entity, which may be hardware, firmware, a combination of hardware and software, software or running software. For example, a component may include, but not limited to: a process running on a processor, a processor, an object, an executable file, a thread under execution, a program, and/or a computer. For example, both an application running on a computing device and the computing device can be referred to as components. One or more components may exist in a process and/or thread under execution, and the components may be located in one computer and/or arranged between two or more computers. Besides, the components can be executed via various computer-readable media having various data structures. The components can make communication in the form of local and/or remote processes according to the signals having one or more data packets (for example, data from a component that interacts with another component in a local system, a distributed system, and/or interacts with other systems in the form of signals via networks like the Internet).

It should be noted that the above embodiments are only used to illustrate the technical solutions of the present invention without any limitation. Although the present invention has been described in detail based on the preferred embodiments, the ordinary technicians skilled in the art should understand that modifications or equivalent replacements is allowed for the technical solutions of the present invention, which should not deviate from the spirit and scope of the technical solutions of the present invention, within the scope of the Claims of the present invention.

What is claimed is:

1. A power feedback control system of MGP system, which is characterized by comprising:
    a measurement and calculation module (100), which is used to detect an actual active power delivered by a generator to power grid and make a difference between a measured active power and a given active power;
    a PI regulation module (200), which is used to calculate a frequency regulation amount according to the difference between the measured active power and the given active power obtained from the measurement and calculation module and take the frequency regulation amount as feedback;
    a regulation module (300), which is used to fine tune a frequency of a converter of the control system according to a frequency reference value calculated in the control system, which is in response to the feedback of the frequency regulation amount obtained from the PI regulation module, and to regulate a phase difference through frequency modulation;
    wherein the PI regulation module further comprises:
        a calculation unit, which is used to calculate the frequency regulation amount according to the difference between the measured active power and the given active power obtained from the measurement and calculation module; and
        a feedback unit, which is used to feed back the calculated frequency regulation amount to the control system for the regulation module;
    wherein the regulation module (300) further comprises:
        a detection unit, which is used to detect the frequency reference value of the converter which is calculated in the control system in response to the feedback of the frequency regulation amount obtained from the PI regulation module; and
        a regulation unit, which is used to fine tune the frequency of the converter according to the frequency reference value which is detected by the detection unit, and to regulate the phase difference through frequency modulation;
    wherein a requirement for setting a target power of the power feedback control system includes clicking to set a reference value of an active power output by the generator, and wherein the reference value of the active power is the active power of the generator phase A, which is not higher than a rated power of a motor, and a transmission power of the motor is maintained within a rated range;
    wherein, when the power feedback control system is used, a given value of the active power is set to a small value, and a changeover switch of the feedback control system is set to a power feedback signal position;
    wherein the power feedback control system is configured to directly use a frequency difference in the MGP system for controlling a transmission of an active power for the MGP system, and a phase difference between terminal voltages of two motors in the MGP system is proportional to a transmission power thereof;
    wherein, when an actual transmission power is greater than a target power, the power feedback control system increases an output voltage frequency of the converter to enlarge the phase difference and increase the transmission power, and wherein, when the actual transmission power is less than the target power, the power feedback control system reduces the output voltage frequency of the converter to shorten the phase difference and decrease the transmission power.

2. The power feedback control system of MGP system according to claim 1, wherein the given value of the active power is set to 300 W.

3. The power feedback control system of MGP system according to claim 1, wherein the power feedback control system is a single control quantity and a single controlled quantity, such that only one group of the PI regulation module (200) is needed to realize closed-loop control.

4. A power feedback control method for a MGP system using a power feedback control system, comprising:
    detecting an actual active power delivered by a generator to power grid using a measurement and calculation module (100);
    obtaining a difference between a measured active power and a given active power using the measurement and calculation module (100);
    calculating a frequency regulation amount by using PI regulation module (200) and using the same as feedback according to the difference between the measured active power and the given active power obtained from the measurement and calculation module;

calculating a frequency reference value of a converter of the MGP system in a control system;

fine tuning a frequency of the converter by using a regulation module (300);

regulating a phase difference by using a frequency modulation; and achieving a goal of controlling a power output for the MGP system;

wherein the power feedback control system is configured to directly use a frequency difference in the MGP system for controlling a transmission of an active power for the MGP system, and a phase difference between terminal voltages of two motors in the MGP system is proportional to a transmission power thereof;

wherein, when an actual transmission power is greater than a target power, the power feedback control system increases an output voltage frequency of the converter to enlarge the phase difference and increase the transmission power, and wherein, when the actual transmission power is less than the target power, the power feedback control system reduces the output voltage frequency of the converter to shorten the phase difference and decrease the transmission power.

* * * * *